(12) United States Patent
Dittmar et al.

(10) Patent No.: US 6,430,797 B1
(45) Date of Patent: Aug. 13, 2002

(54) AID FOR THREADING A SEAT BELT THROUGH A CHILD SAFETY RESTRAINT

(76) Inventors: Dezarae J. Dittmar; Edward S. Dittmar, both of 105 Cottonwood Dr., Franklin, TN (US) 37069

(*) Notice: Subject to any disclaimer, the term of this patent is extended or adjusted under 35 U.S.C. 154(b) by 0 days.

(21) Appl. No.: 09/725,148

(22) Filed: Nov. 29, 2000

(51) Int. Cl.⁷ .............................................. B25B 27/14
(52) U.S. Cl. ........................... 29/278; 29/270; 81/487; 294/1.1; 294/99.1; 294/19.1
(58) Field of Search ................ 29/278, 270; 412/37; 81/44, 488, 487; 254/134.3 R, 134.3 FT; 294/3.6, 26, 1.1, 99.1, 19.1

(56) References Cited

U.S. PATENT DOCUMENTS

| | | | |
|---|---|---|---|
| 3,424,038 A | * | 1/1969 | Smith .............................. 81/3 |
| 5,197,176 A | * | 3/1993 | Reese .......................... 29/278 |
| 5,496,083 A | * | 3/1996 | Shouse ........................ 294/1.1 |
| 5,620,231 A | | 4/1997 | Marker et al. |
| 5,954,397 A | | 9/1999 | Czernakowski et al. |
| 6,167,602 B1 | * | 1/2001 | Yang et al. .................... 29/278 |

* cited by examiner

Primary Examiner—Joseph J. Hail, III
Assistant Examiner—Daniel Shanley
(74) Attorney, Agent, or Firm—Banner & Witcoff, Ltd.

(57) ABSTRACT

A device helps the user pull a vehicle seat belt mechanism through a child safety restraint seat to secure the seat in the vehicle. One design includes an elongated handle with a pocket at the other end. The pocket end includes: (a) a chamber with (b) an open face large enough for the seat belt mechanism to enter the chamber, and (c) a slot in one of the walls for the belt to fit into. Another design includes an elongated handle with a spring hook at the other end. This spring hook mechanism includes: (a) a base portion connected with the elongated handle and (b) a free hook end extending from the base portion toward the second end of the handle member. The free hook end includes a hook member for engaging a portion of the seat belt mechanism. The devices would be preferably formed from a rigid but flexible material, like a strong plastic.

20 Claims, 4 Drawing Sheets

AID FOR THREADING A SEAT BELT THROUGH A CHILD SAFETY RESTRAINT

FIELD OF THE INVENTION

This invention relates to a device to assist in the installation of a child safety restraint seat of the type designed to rest on a vehicle seat and to be secured to the vehicle seat by a vehicle lap or shoulder belt which passes between the child restraint occupant and the vehicle seat.

RELATED ART

A common design of a child safety restraint seat includes a transverse channel or path in a base or frame for receiving a seat belt of the lap or shoulder type in a tie-down arrangement. The male metal engagement plate of the seat belt buckle passes through the child safety restraint seat and is coupled to a mating female buckle on the other side, thereby securing the child safety restraint seat to the vehicle.

Often, the transverse channel or path the male metal engagement plate and fabric belt must take through the base or frame of the child safety restraint seat is smaller than a person's hand or arm and/or is not a straight smooth path for the seat belt to transverse. This makes it difficult to thread the seat belt through the child safety restraint seat and to secure the safety seat to the seat of a vehicle.

Various aids for threading a seat belt through a child safety restraint seat have been developed. For example, U.S. Pat. No. 5,197,176 to Reese shows one such design. The device of Reese is designed so that the male engagement plate of the seat belt must go past the hinged/base end of the hook, past the point of the hook, and then back to the hinged/base end in order for it to be engaged. This arrangement makes the device of Reese difficult to use. Also, in this device, the hinged/base end of the hook must be smaller than the hole in the male engagement plate of the seat belt. Because the holes used in the design of many of the male engagement plates used in vehicles today are quite small, the hook of the Reese device also must be made very small to accommodate different male engagement plates. When the hooks are made so small, the hook member will have insufficient strength and durability needed for repeated use.

Accordingly, there is a need in the art for a device to assist a user in installing a child safety restraint seat in a vehicle that is strong, durable, inexpensive, easy to use, and easy to produce.

SUMMARY OF THE INVENTION

This invention provides a simple tool to aid in threading a seat belt through the frame or base of a child safety restraint seat without putting undue stress on the installer.

One embodiment of the device according to the invention includes an elongated handle member and a pocket member located at one end of the elongated handle member. This pocket member includes: at least one wall that defines a chamber to receive a portion of a seat belt mechanism, an open face of sufficient size to allow the portion of the seat belt mechanism to enter into the chamber, and a slot defined in the wall, wherein the slot is sized and located so as to allow a restraining band portion of the seat belt mechanism to extend outside the chamber and to retain the portion of the seat belt mechanism within the chamber when the handle member is pulled.

In a more specific embodiment of the invention, the wall of the pocket member may include an end wall portion and a side wall portion, wherein the slot extends from the open face and partially through the end wall portion. More specifically, the wall of the pocket member may include at least two side wall portions and an end wall portion, wherein the slot extends from the open face and partially through the end wall portion. Even more specifically, the wall of the pocket member may include; a proximal end wall portion; a distal end wall portion; and three side walls extending between the proximal end wall portion and the distal end wall portion, wherein the open face of the pocket member is located between two of the three side walls, and wherein the slot extends from the open face and partially through the distal end wall portion.

Preferably, the pocket member is integrally formed with the elongated handle member, and each are formed from a flexible but rigid material, such as plastic.

Another embodiment of the device according to the invention includes an elongated handle member having a first end and a second end; and a spring hook mechanism located proximate the second end of the elongated handle member, wherein the spring hook mechanism includes: (a) a base portion connected with the elongated handle member, wherein a connection joint between the base portion and the elongated handle member is located a first distance from the first end of the elongated handle member, and (b) a free hook end extending from the base portion toward the second end of the elongated handle member, wherein the free hook end includes a hook member for engaging a portion of the seat belt mechanism, wherein the hook member is located a second distance from the first end of the elongated handle member, and wherein the first distance is less than the second distance.

In this embodiment of the invention, a base surface may be provided proximate the second end of the elongated handle member, wherein the free hook end of the spring hook mechanism extends above the base surface. A hole may be defined through the elongated handle member proximate the second end at the base surface, wherein the base portion of the spring hook mechanism is located at one side of the hole, and wherein the free hook end of the spring hook mechanism extends over the hole.

Also, in this embodiment of the invention, the spring hook mechanism may be integrally formed with the elongated handle member. Preferably, the spring hook mechanism is rigid but flexible, advantageously made from a plastic material.

BRIEF DESCRIPTION OF THE DRAWINGS

The invention will be more fully understood when considered in conjunction with the following detailed description and the attached drawings, which include.

DETAILED DESCRIPTION OF THE PREFERRED EMBODIMENTS

Figure 1:
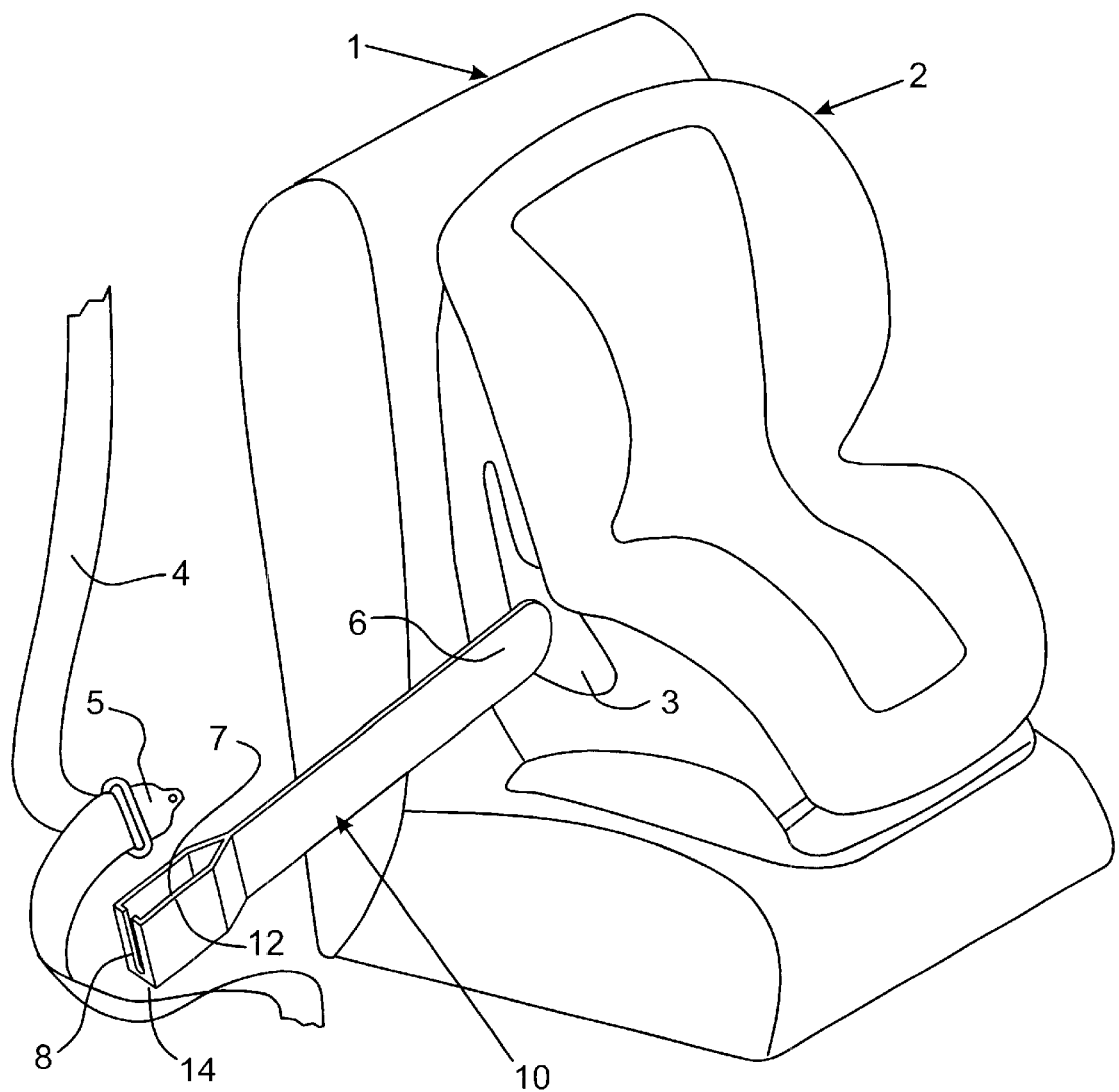
FIG. 1, which is a perspective view of a first embodiment of the invention (the pocket design) showing how the seat belt male engagement plate engages the pocket in the threading aid and the threading aid positioned to be threaded through the child safety restraint seat.
Figure 2:
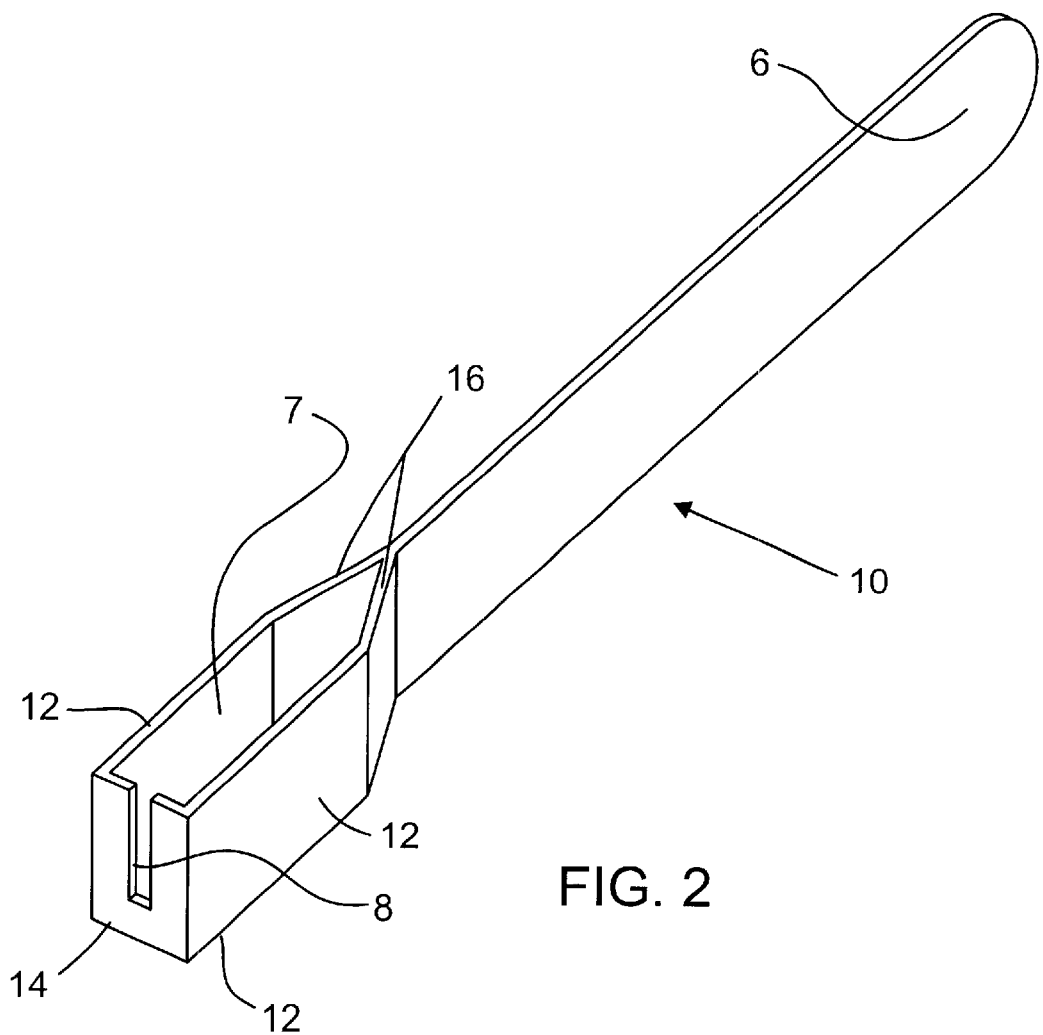
FIG. 2, which is a drawing showing a perspective view of the pocket design in more detail.
Figure 3:
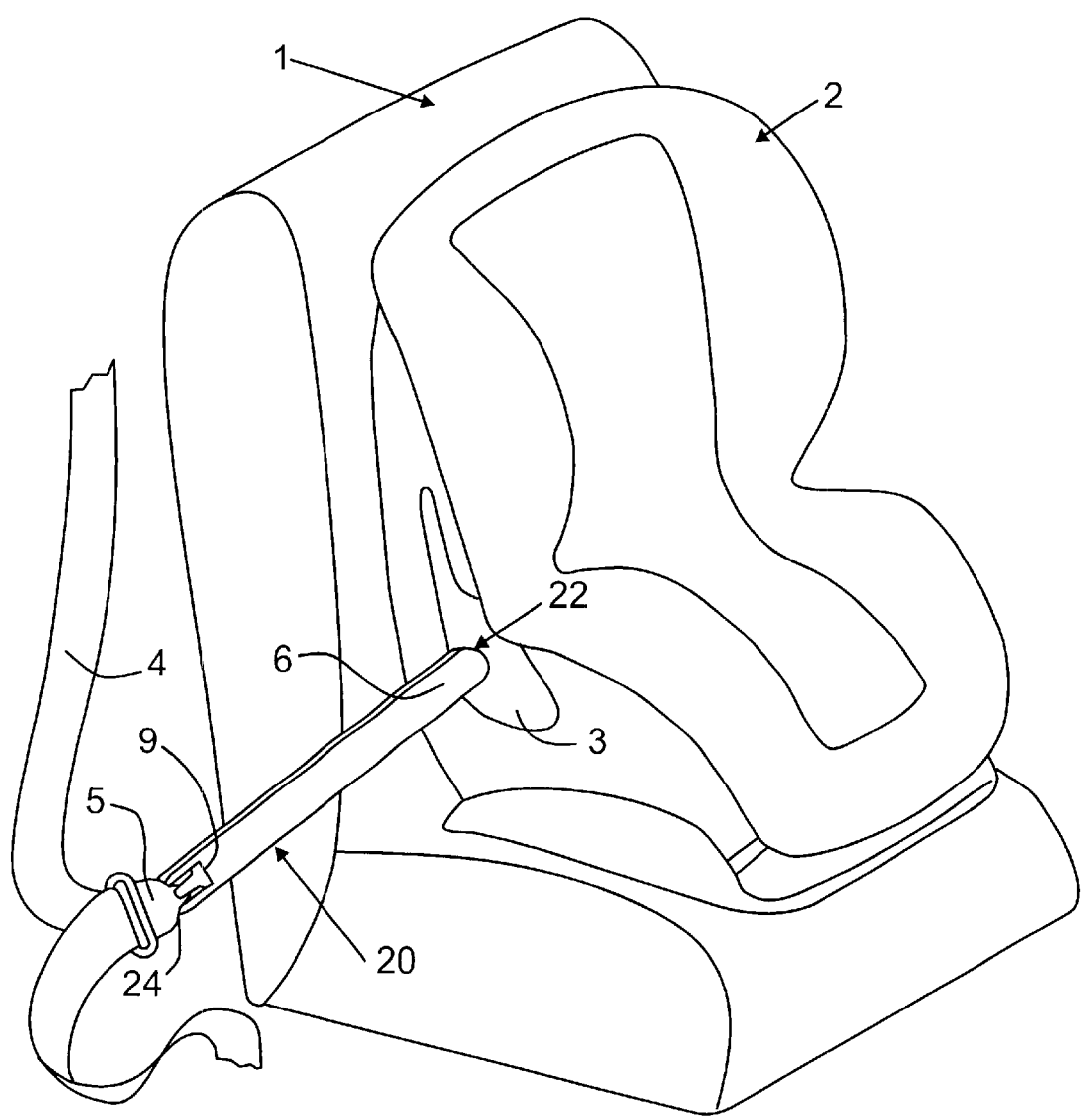
FIG. 3, which is a perspective view of a second embodiment of the invention (the spring hook design) showing how the seat belt male engagement plate engages the spring hook of the threading aid and the threading aid positioned to be threaded through the child safety restraint seat.

FIGS. 1 and 2 are perspective views showing the pocket design of the invention. To secure a child safety restraint seat 2 to a vehicle seat 1, a male engagement plate 5 of the fabric shoulder belt 4 must be pulled through a transverse channel 3 provided in the child safety restraint seat 2. Then, the male engagement plate 5 is engaged with the female buckle portion of the seat belt (not shown) to secure the child safety restraint seat 2 to the vehicle seat 1.

The invention comprises a device 10 to assist the user in pulling the male engagement plate 5 of the seat belt through the transverse channel 3 of the child safety restraint seat 2. The device 10 includes an elongated handle member 6 with a pocket member located at one end of the handle member 6. The pocket member includes at least one wall 12 that defines a pocket chamber 7 for receiving a portion of the seat belt mechanism (i.e., either the male engagement plate 5 or the female buckle or clasp portion). One wall of the pocket member (e.g., the distal end wall portion 14) includes a slot 8, which extends from the open face of the pocket member and through the end wall portion 14. This slot 8 may extend completely across the end wall portion 14 (or other wall), if desired, but preferably, as illustrated in FIGS. 1 and 2, it extends partially across the wall in which it is formed, e.g., the end wall portion 14. In use, as exemplified in FIG. 1, the male engagement plate 5 of the seat belt fits into the pocket chamber 7 and the fabric shoulder belt 4 freely extends out of the pocket chamber 7 through the slot 8. The slot 8 is appropriately sized and located such that the male engagement portion 5 of the seat belt will not pass through the slot 8 when the device 10 is pulled through the transverse channel 3 of the child safety restraint seat 2. If desired, the slot 8 may be somewhat tapered to allow for easy insertion of the seat belt fabric 4.

The elongated handle member 6 serves as a handle long enough to pass through the transverse channel 3 of the child safety restraint seat 2. The pocket chamber 7 is large enough to accept the male engagement plate 5 of the buckle. The pocket chamber 7 according to the invention can be of any appropriate shape and size, provided it can accommodate the seat belt buckle part and it can easily pass through the transverse channel 3. In the illustrated embodiment, the pocket chamber 7 includes a proximal end wall 16 (which may be V-shaped, as illustrated, flat, rounded, etc.), three side walls 12, and one distal end wall 14, wherein the open face of the pocket chamber 7 is provided between two of the three side walls 12 and between the proximal end wall 16 and the distal end wall 14, and wherein the slot 8 is provided in the distal end wall 14, extending from the open face. Preferably, the entire device 10 according to the invention is integrally molded from an appropriate plastic composition (e.g., by injection molding) to provide a product that is somewhat flexible, yet rigid and strong.

Preferably, the handle member 6 is long enough so that one end of the handle 6 extends from one end of the transverse channel 3 at the same time that the pocket chamber 7 protrudes from the other end. This allows the belt male engagement plate 5 to be easily placed in the pocket 7 with the fabric belt 4 going into the slot 8. The device 10 can then be pulled through the transverse channel 3 or path in the base or frame to the other side where the male engagement plate 5 can be easily removed and engaged into the female buckle.

Advantages of the device 10 according to this design include the following:

1. it is compatible with many different styles and sizes of seat belt buckle designs;
2. it can be made of a plastic material having sufficient flexibility to pass through nonlinear transverse channels or paths 3;
3. it is easy to use;
4. it can be manufactured at low cost;
5. it is a simple, one-piece design;
6. the pocket is very durable compared to hooks small enough to engage the hole in a male seat belt engagement plate;
7. it has no moving parts; and
8. it has a thin, flat design that lends itself to easy storage within the seat or the vehicle.

The above detailed description and FIGS. 1 and 2 illustrate one preferred embodiment of the invention. Those skilled in the art will recognize, however, that various changes and modifications can be made to this specifically illustrated design without departing from the invention. For example, while the illustrated embodiment of the invention shows a male engagement plate 5 of a seat belt being pulled through the transverse channel 3 of the child safety restraint seat 2, one could also use the device 10 according to the invention to pull a female buckle or clasping mechanism of the seat belt through the transverse channel 3. Also, as another example, the slot 8 could be formed in another wall 12 or 16 of the pocket member without departing from the invention. The pocket member also could take on a variety of other shapes without departing from the invention.

FIGS. 3 and 4A–4C illustrate the spring hook design 20 of the invention in detail. In this embodiment of the invention, an elongated handle member 6 includes a first end 22 and a second end 24. The second end 24 includes a spring hook mechanism 9. Like the embodiment of FIGS. 1 and 2, the elongated handle member 6 serves as a handle long enough to pass through the transverse channel 3 of the child safety restraint seat 2. The spring hook mechanism 9 includes a base portion 26 connected with the handle member 6 at a connection joint. A free hook end 28 extends from the base portion 26 toward the second end 24 of the elongated handle member 6. The free hook end 28 includes a hook member 30 that is small enough for engaging a hole 32 defined in the tongue of the male engagement member 5 of a seat belt. The hook member 30 is located a longer distance from the first end 22 of the handle member 6 as compared to the distance between the base portion 26 and the first end 22.

Figure 4A:
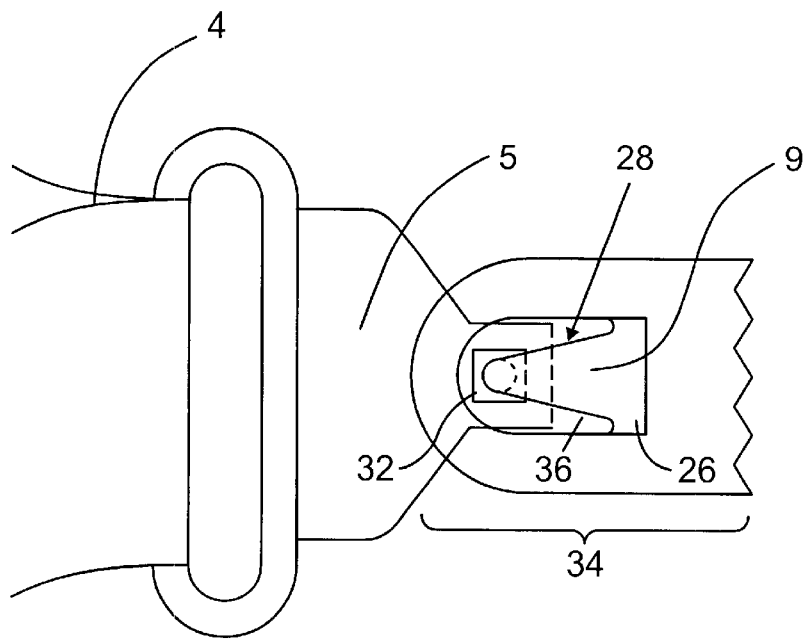
FIGS. 4A through 4C, which show three views of the spring hook design of the invention in more detail, namely a top flat view (FIG. 4A), a side edge view (FIG. 4B), and a perspective view (FIG. 4C).
Figure 4B:
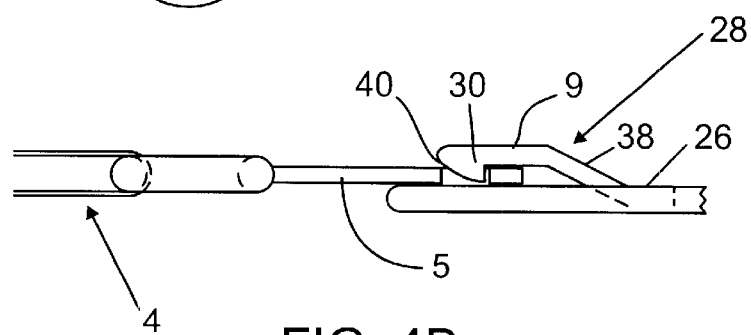
Figure 4C:
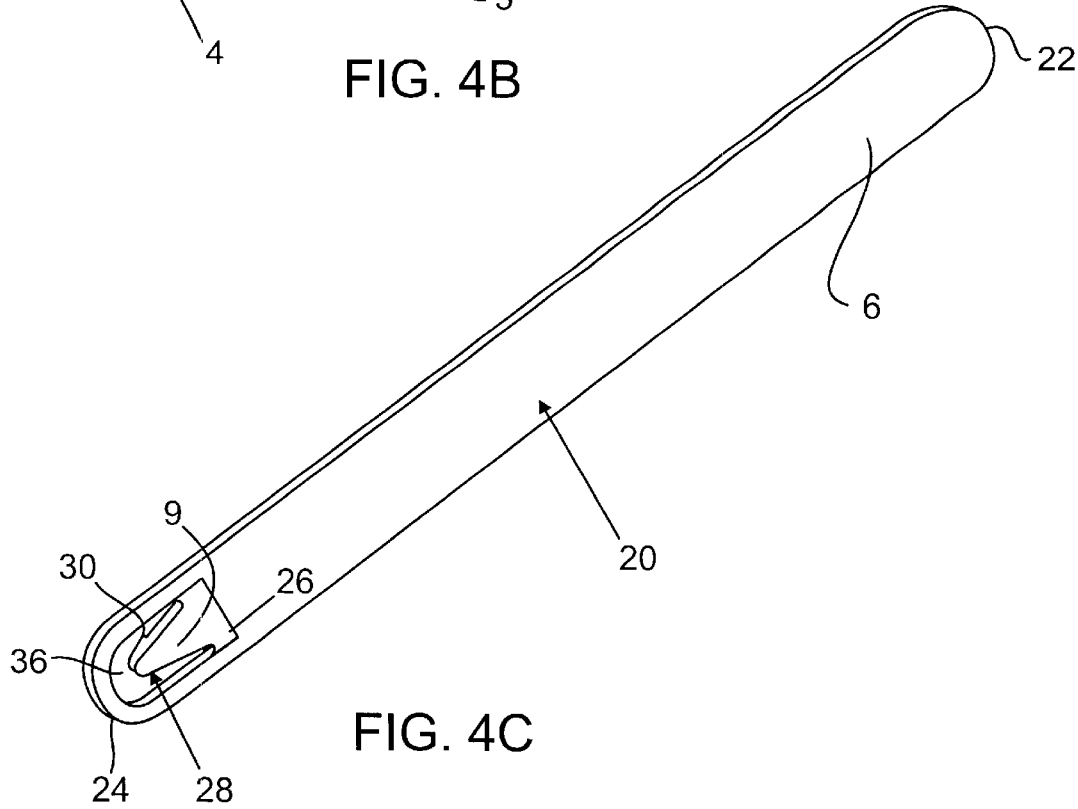

The handle member 6, proximate the second end 24, includes a base surface portion 34 that is planar or substantially planar. Advantageously, a hole 36 may be defined through this base surface portion 34. As illustrated in FIGS. 4A–4C, the free hook end 28 of the spring hook mechanism 9 has an upwardly angled base member 38 such that the hook member 30 extends above the base surface 34 and over the hole 36. Additionally, the lead edge portion 40 of the hook member 30 is angled downwardly toward the hole 36 and back toward the base portion 26. This arrangement makes it easier to engage and disengage the hook member 30 with the hole 32 in the male engagement plate 5 of the seat belt. The base portion 26 of the spring hook mechanism 9 is located at the end of the hole 36 located closer to the first end 22 of the handle member 6.

The entire spring hook device 20 according to the invention preferably is molded (e.g., injection molded) from an appropriate plastic composition that is flexible, yet strong and rigid.

Like the pocket chamber embodiment of the invention, the length of the handle member 6 of the device 20 according to this embodiment of the invention is sufficient so that the handle 6 may extend from one end of the transverse channel 3 at the same time that the spring hook mechanism 9 protrudes from the other end. This allows the male engagement plate 5 to be snapped onto the spring hook mechanism 9 (i.e., the hook member 30 snaps into the hole 32 in the male engagement plate 5 to thereby pinch the male engagement plate 5 between the hook member 30 and the base surface 34). The device 20 can then be pulled through the transverse channel 3 or path in the base or frame of the child safety seat 2 to the other side where the male engagement plate 5 can easily be removed and engaged into the female buckle.

Advantages of this design include:
1. it is compatible with many different styles and sizes of the male seat belt engagement plate;
2. it has the flexibility to pass through nonlinear paths;
3. it is easy to use;
4. it may be manufactured at low cost;
5. it has a simple, one-piece design;
6. it has a hook member that is smaller than the male seat belt engagement plate but the base portion of the hook is wider; and
7. it has a thin, flat design that lends itself to easy storage within the seat or the vehicle.

This design distinguishes from the design of the Reese patent described above in that the leading, free edge of the spring hook mechanism 9 is closest to the direction from which the male engagement plate 5 approaches the device 20 in use. Also, the hinged/base portion 26 of the spring hook mechanism 9 is located farther away from the direction from which the male engagement plate 5 approaches the device 20 in use. This enables the device 20 according to the invention to be very easily and directly connected to the male engagement plate 5. This also allows the hinged/base portion 26 of the spring hook mechanism 9 to be as large as needed to provide strength and durability. It also provides a place for the user to press to open up the spring hook mechanism 9 to make engagement and disengagement of the male engagement plate 5 easy.

The devices according to the invention can be appropriately shaped and dimensioned so as to provide the desired degree of strength and flexibility while making the device easy to produce and use and readily adaptable for use with a variety of different vehicles and safety seats. For example, the handle member 6 and the pocket chamber 7 can have a variety of different shapes and dimensions without departing from the invention. Also, in the spring hook embodiment, those of ordinary skill in the art will be able to determine appropriate shapes and dimensions for the hinged/base portion 26, the free hook end 28, the hook member 30, the hole 36, the base member 38, and the lead edge portion 40 through routine experimentation. For example, the base member 38 and the lead edge portion 40 are angled in the illustrated embodiment. These angled members 38 and 40 can be straight, curved, or otherwise appropriately shaped without departing from the invention.

If desired, each end of the handle member 6 may include one of the devices for engaging the seat belt mechanism and pulling it through the transverse channel 3 of the child safety seat 2. For example, the handle member 6 may have a pocket chamber 7 provided at each end or a spring hook mechanism 9 provided at each end. As another alternative, one end of the handle member 6 may include a spring hook mechanism 9 while the other end includes a pocket member 7. Providing devices for engaging the seat belt mechanism at each end of the handle member 6 advantageously increases the life of the device according to the invention.

Also, the illustrated embodiments of the invention show the handle member 6 and the walls of the pocket chamber 7 as solid plastic walls. Of course, in order to save manufacturing costs and materials, holes can be molded into the handle member 6 and the walls of the pocket chamber 7.

While the invention has been described in terms of various specific embodiments and preferred aspects, those skilled in the art will recognize that various changes and modifications can be made to these designs without departing from the spirit and scope of the invention as defined in the appended claims.

What is claimed is:

1. A device for pulling a seat belt mechanism through a child safety restraint seat, comprising:
    an elongated handle member; and
    a pocket member located at one end of the elongated handle member, wherein the pocket member includes:
        at least one wall that defines a chamber to receive a portion of the seat belt mechanism, wherein the wall includes at least two side wall portions and an end wall portion,
        an open face of sufficient size to allow the portion of the seat belt mechanism to enter into the chamber, and
        a slot defined in the wall, wherein the slot is sized and located so as to allow a restraining band portion of the seat belt mechanism to extend outside the chamber and to retain the portion of the seat belt mechanism within the chamber when the handle member is pulled, wherein the slot extends from the open face and partially through the end wall portion.

2. A device according to claim 1, wherein the pocket member is integrally formed with the elongated handle member.

3. A device according to claim 1, wherein the pocket member is rigid.

4. A device according to claim 1, wherein the pocket member and the elongated handle member are integrally formed from a rigid material.

5. A device according to claim 4, wherein the rigid material is plastic.

6. A device for pulling a seat belt mechanism through a child safety restraint seat, comprising:
    an elongated handle member; and
    a pocket member located at one end of the elongated handle member, wherein the pocket member includes:
        at least one wall that defines a chamber to receive a portion of the seat belt mechanism, wherein the wall of the pocket member includes: a proximal end wall portion, a distal end wall portion, and three side walls extending between the proximal end wall portion and the distal end wall portion,
        an open face of sufficient size to allow the portion of the seat belt mechanism to enter into the chamber, wherein the open face of the pocket member is located between two of the three side walls, and
        a slot defined in the wall, wherein the slot is sized and located so as to allow a restraining band portion of the seat belt mechanism to extend outside the chamber and to retain the portion of the seat belt mechanism within the chamber when the handle member is pulled.

7. A device according to claim 6, wherein the slot extends from the open face and partially through the distal end wall portion.

8. A device according to claim 6, wherein the pocket member is integrally formed with the elongated handle member.

9. A device according to claim 6, wherein the pocket member is rigid.

10. A device according to claim 6, wherein the pocket member and the elongated handle member are integrally formed from a rigid material.

11. A device according to claim 10, wherein the rigid material is a plastic.

12. A device for pulling a seat belt mechanism through a child safety restraint seat, comprising:

an elongated handle member having a first end and a second end; and a spring hook mechanism located proximate the second end of the elongated handle member, wherein the spring hook mechanism includes:

a base portion connected with the elongated handle member, wherein a connection joint between the base portion and the elongated handle member is located a first distance from the first end of the elongated handle member, and a free hook end extending from the base portion toward the second end of the elongated handle member, wherein the free hook end includes a hook member for engaging a portion of the seat belt mechanism, wherein the hook member is located a second distance from the first end of the elongated handle member, and wherein the first distance is less than the second distance.

13. A device according to claim 12, wherein a base surface is provided proximate the second end of the elongated handle member, and wherein the free hook end of the spring hook mechanism extends above the base surface.

14. A device according to claim 12, wherein a hole is defined through the elongated handle member proximate the second end, wherein the base portion of the spring hook mechanism is located at one side of the hole, and wherein the free hook end of the spring hook mechanism extends over the hole.

15. A device according to claim 12, wherein a base surface is provided proximate the second end of the elongated handle member, wherein a hole is defined through the base surface, wherein the base portion of the spring hook mechanism is located at one side of the hole, and wherein the free hook end of the spring hook mechanism extends over the hole toward the second end of the elongated handle member.

16. A device according to claim 12, wherein the spring hook mechanism is integrally formed with the elongated handle member.

17. A device according to claim 12, wherein the spring hook mechanism is rigid but flexible.

18. A device according to claim 12, wherein the spring hook mechanism and the elongated handle member are integrally formed from a rigid material.

19. A device according to claim 18, wherein the rigid material is a plastic.

20. A device according to claim 12, wherein the base portion of the spring hook mechanism is wider than the free hook end of the spring hook mechanism.

* * * * *